(12) United States Patent
Hills

(10) Patent No.: US 10,752,358 B2
(45) Date of Patent: Aug. 25, 2020

(54) SYSTEMS AND METHODS FOR REFRESHING PASSENGER GARMENTS ONBOARD AN AIRCRAFT

(71) Applicant: THE BOEING COMPANY, Chicago, IL (US)

(72) Inventor: Karen L. Hills, Everett, WA (US)

(73) Assignee: The Boeing Company, Chicago, IL (US)

(*) Notice: Subject to any disclaimer, the term of this patent is extended or adjusted under 35 U.S.C. 154(b) by 767 days.

(21) Appl. No.: 14/886,530

(22) Filed: Oct. 19, 2015

(65) Prior Publication Data
US 2017/0107659 A1 Apr. 20, 2017

(51) Int. Cl.
*B64D 11/00* (2006.01)
*D06F 73/02* (2006.01)
*D06F 58/10* (2006.01)

(52) U.S. Cl.
CPC ............ *B64D 11/00* (2013.01); *D06F 58/10* (2013.01); *D06F 73/02* (2013.01)

(58) Field of Classification Search
CPC ........ D06F 58/10; D06F 73/02; B64D 11/003
See application file for complete search history.

(56) References Cited

U.S. PATENT DOCUMENTS

| | | | | |
|---|---|---|---|---|
| 3,811,198 A | * | 5/1974 | Baltes | D06F 58/10 34/233 |
| 6,055,996 A | * | 5/2000 | Sprenger | A47L 15/0076 134/133 |
| 6,143,185 A | * | 11/2000 | Tracy | B64D 11/02 210/195.1 |
| 8,292,223 B2 | | 10/2012 | Lamoree | |
| 8,678,493 B2 | | 3/2014 | Lamoree | |
| 2005/0211833 A1 | * | 9/2005 | Frantz | B64C 1/20 244/118.1 |
| 2007/0063101 A1 | * | 3/2007 | Tiid | B64D 9/003 244/118.5 |
| 2007/0256457 A1 | * | 11/2007 | Kendall | D06F 29/00 68/3 R |
| 2014/0224454 A1 | * | 8/2014 | Schootstra | B64D 11/04 165/104.19 |
| 2015/0203203 A1 | | 7/2015 | McIntosh | |

* cited by examiner

*Primary Examiner* — Joseph L. Perrin
(74) *Attorney, Agent, or Firm* — The Small Patent Law Group LLC; Joseph M Butscher

(57) ABSTRACT

An aircraft includes a fuselage having an internal cabin, and a garment refreshing system located within the internal cabin. The garment refreshing system is operable to refresh a garment of an individual within the internal cabin. A method of refreshing a garment while onboard an aircraft includes positioning a garment refreshing system within an internal cabin of a fuselage of an aircraft, and refreshing a garment of an individual onboard the aircraft with the garment refreshing system.

17 Claims, 8 Drawing Sheets

SYSTEMS AND METHODS FOR REFRESHING PASSENGER GARMENTS ONBOARD AN AIRCRAFT

FIELD OF THE DISCLOSURE

Embodiments of the present disclosure generally relate to systems and methods for refreshing passenger garments onboard a vehicle, such as a commercial aircraft.

BACKGROUND OF THE DISCLOSURE

Commercial aircraft are used to transport passengers between various locations. During a flight—particularly a trans-oceanic or other long haul flight—passengers are typically confined within certain areas (for example, cabins) of an aircraft. As can be appreciated, at least some of the passengers may discover that certain articles of clothing (for example, jackets and shirts) may become wrinkled, musty, moistened with sweat (such as at areas proximate a neck, underarms, and/or the like), sullied (such as if a drink is spilled on a garment), or otherwise compromised (that is, less than clean and crisp), such as when the passengers spend time in an airport awaiting a flight. Often, when the aircraft arrives at a destination, a passenger may disembark the aircraft wearing at least one compromised garment. As such, the passenger wearing the compromised garment typically needs to clean the garment after the flight. However, time is valuable, and many passengers may simply do not have enough time while on a trip to search for and find a cleaner. Even if a passenger does find a cleaner, he/she may squander valuable time finding the cleaner and/or otherwise cleaning the garment(s), instead of using such time for other priorities.

SUMMARY OF THE DISCLOSURE

A need exists for systems and methods of refreshing garments (such as articles of clothing) aboard a commercial aircraft and other vehicles. A need exists for systems and methods that allow passengers to feel and look refreshed after a journey aboard a vehicle, such as a commercial aircraft. The refreshing may include, for example, warming, cooling, sanitizing, brushing, removing lint, and the like from various garments such as clothing, blankets, and the like.

With that in mind, certain embodiments of the present disclosure provide an aircraft that may include a fuselage having an internal cabin, and a garment refreshing system located within the internal cabin. The garment refreshing system is operable to refresh a garment of an individual (such as a passenger, pilot, flight attendant, or the like) within the internal cabin.

The garment refreshing system may include one or more refreshers operable to refresh the garment. The refreshers may include, for example, one or more of a mister, a steamer, an ultraviolet light, a scent emitter, a detergent emitter, a heater, and/or an agitator (such as a vibrating mechanism).

The garment refreshing system may include a housing defining an internal refreshing compartment, and an access door moveable between a closed position in which the refreshing compartment is closed and an open position in which the refreshing compartment is opened. The refreshing compartment receives the garment when the access door is in the open position.

The aircraft may include at least one seat track on a floor within the internal cabin. The garment refreshing system may securely mount to at least a portion of the seat track(s) through at least one fitting assembly. In at least one embodiment, the garment refreshing system may be positioned within a closet of the internal cabin. In at least one embodiment, the garment refreshing system may securely mount to a dedicated floor fitting, an intercostal, or the like.

The garment refreshing system may include one or more dryers operable to dry the garment. The garment refreshing system may include at least one vent operable to control a moisture level within one or both of the garment refreshing system or the internal cabin. The garment refreshing system may include a rack (such as within the refreshing compartment) onto which the garment may be hung or placed.

In at least one embodiment, the garment refreshing system may include a control unit operatively coupled to a user interface. The control unit operates the garment refreshing system based on operating commands input through the user interface.

Certain embodiments of the present disclosure provide a method of refreshing a garment while onboard an aircraft. The method may include positioning a garment refreshing system within an internal cabin of a fuselage of an aircraft, and refreshing a garment of an individual onboard the aircraft with the garment refreshing system. The method may include moving an access door of the garment refreshing system to expose an internal refreshing compartment of a housing, receiving the garment within the refreshing compartment, and closing the access door to close the garment within the refreshing compartment. The refreshing operation occurs after the closing operation.

DETAILED DESCRIPTION OF THE DISCLOSURE

Figure 1:
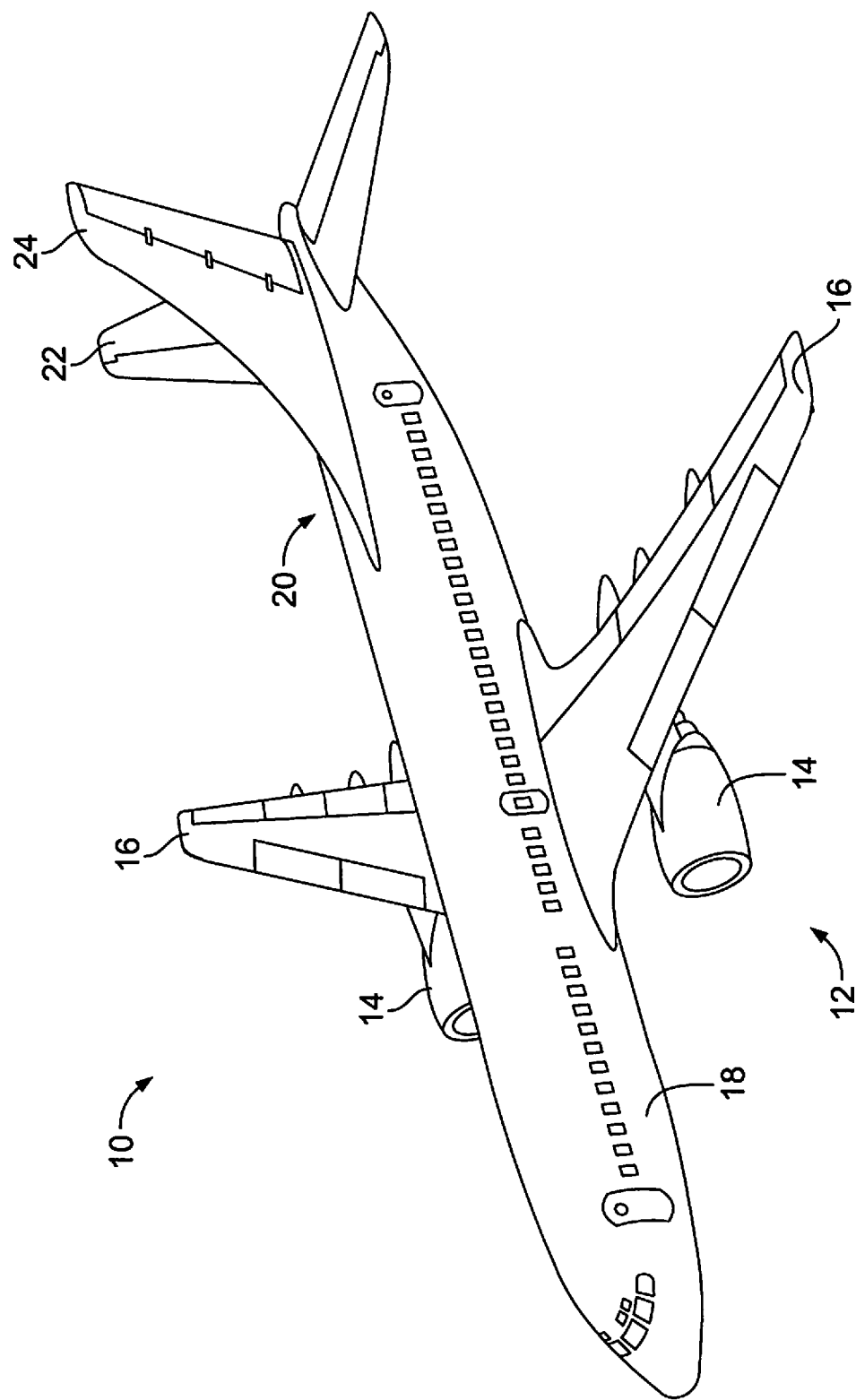
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a system and method for sanitizing garments onboard a vehicle, such as an aircraft. The system and method may include receiving a garment in a compartment of a garment refreshing system associated within a vehicle interior, and refreshing the garment. The refreshing may include one or more of steaming, scenting, cleansing, scenting, emitting ultraviolet light, agitating, articulating, vibrating, and/or the like. The compartment may be located within a cabin of the vehicle, such as within a closet, a suite, a crewrest, a lavatory, a galley, and/or secured to seat tracks.

Garments may be received within the compartment of the garment refreshing system after passengers (or a subset thereof) board the vehicle and before such passengers disembark from the vehicle. The garment refreshing system may be positioned within a particular section of the cabin. For example, the garment refreshing system may be positioned within a first class section or a business class section. In at least one other embodiment, the garment refreshing system may be positioned within a galley or attendant station. The garment refreshing system may include one or more vents that are configured to control the amount of moisture that is emitted from the compartment due to operation of the garment refreshing system.

Certain embodiments of the present disclosure provide an aircraft that may include a garment refreshing system within a fuselage of an aircraft. The garment refreshing system may be located in a space between a cockpit and one or more passenger sections within a cabin.

Embodiments of the present disclosure provide systems and methods that provide passengers the opportunity to have garments refreshed onboard a vehicle during the journey to their destination. The garments (which may include various articles of clothing, such as jackets, shirts, hats, and/or the like) may be refreshed by placing them within a garment refreshing system, which may form, or be positioned within, a closet in a cabin of the vehicle. The garments may be refreshed through steam treatment and/or movement (for example, vibration) of the clothes in a hanging position. The garment refreshing system may reside proximate to a galley, lavatory, closet, crew rest, or partitions aboard the aircraft.

Embodiments of the present disclosure provide systems and methods that improve a passenger experience, comfort, and hygiene on board a vehicle. Further, embodiments of the present disclosure increase efficiency for business travelers (in that they can have garments refreshed as they travel, instead of having to do so after their travel experience, as well as travel with less baggage during a flight).

Embodiments of the present disclosure provide systems and methods that allow them to travel lighter by not having to pack as many fresh outfits. Further, embodiments of the present disclosure reduce the need for a garment bag that would ordinarily be required to emerge from a plane with a pristine outfit. Additionally, embodiments of the present disclosure allow a passenger to have a clean, crisp outfit immediately prior to an event following a flight. The refreshing of the outfit occurs closer in time (as compared to cleaning an outfit before a flight), and facilitates outfit changes aboard a plane.

FIG. 1 illustrates a perspective top view of a vehicle, such as an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

Alternatively, instead of an aircraft, embodiments of the present disclosure may be used with various other vehicles, such as automobiles, buses, locomotives and train cars, watercraft, spacecraft, and the like.

Figure 2A:
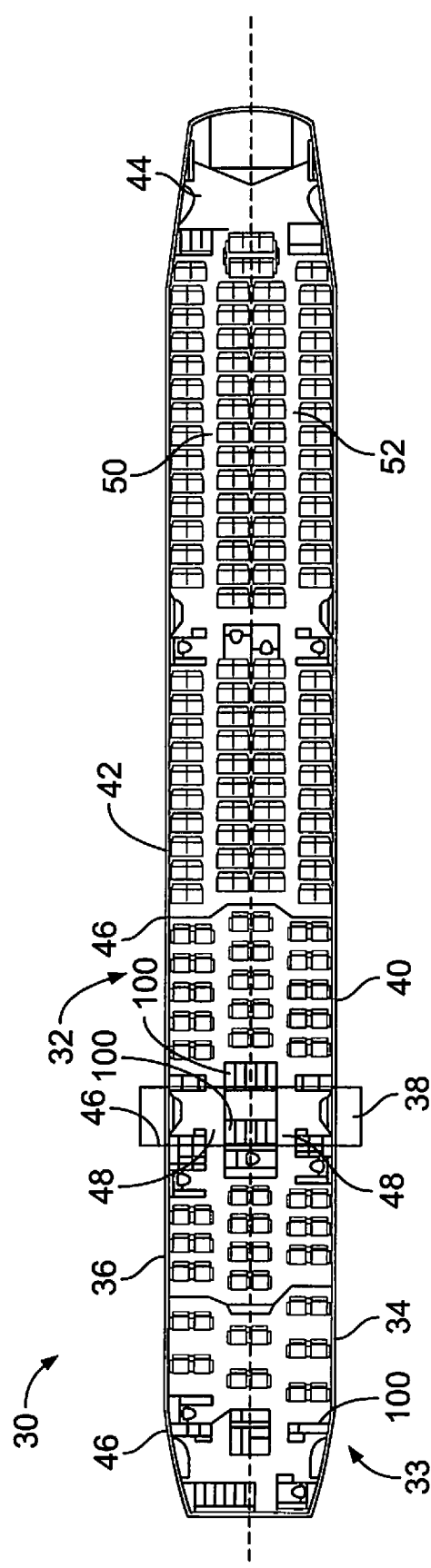
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

One or more garment refreshing systems 100 may be located within the internal cabin 30. For example, a garment refreshing system 100 may be located at a front of the first class section 34. Additionally, or alternatively, a garment refreshing system 100 may be located within a front galley station 38. Additionally, or alternatively, a garment refreshing system 100 may be located within the expanded economy or coach section 40. In short, garment refreshing systems 100 may be located throughout the internal cabin 30. Optionally, the internal cabin 30 may include only a single garment refreshing system 100. The single garment refreshing system 100 may be positioned within the first class section 34 or the business class section 36, and, as such, may be promoted and marketed as a luxury option for passengers in such sections.

In operation, each garment refreshing system 100 is configured to receive one or more passenger garments (such as jackets, shirts, blankets, robes, scarves, ties, or the like) and refresh such garment(s) during a journey between a departure and an arrival at a destination. An operator of the aircraft may offer garment refreshing as an amenity, as part of a rewards program, or charge passengers who use the garment refreshing system 100. As such, the garment refreshing system 100 may represent an additional revenue stream for an operator of the aircraft.

Figure 2B:
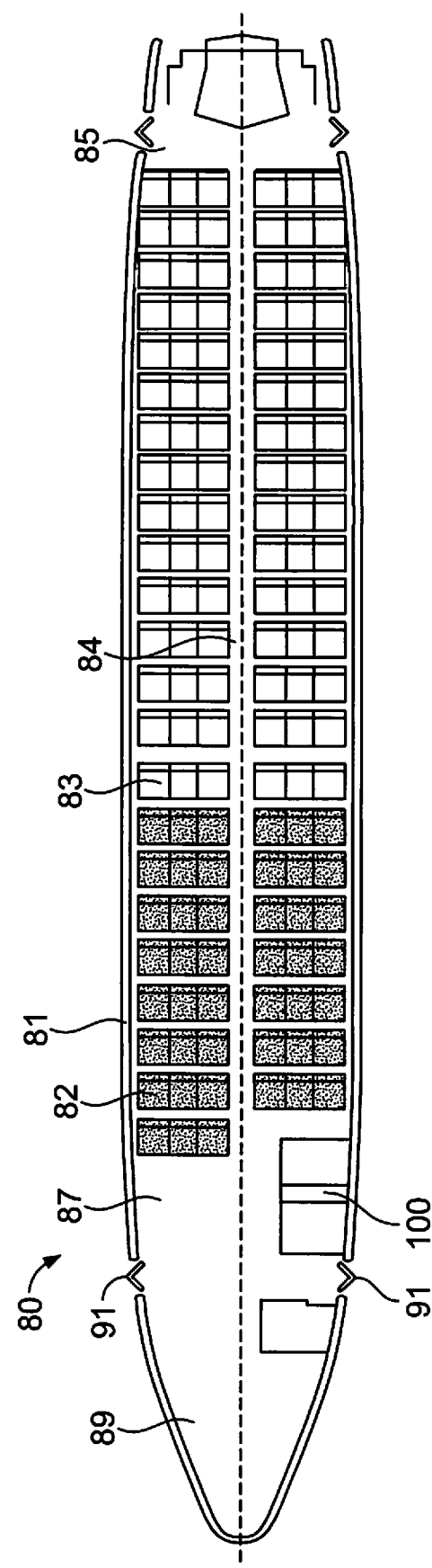
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

A garment refreshing system 100 may be located within the main cabin 82 at a fore section 87 proximate to a cockpit area 89. The cockpit area 89 may be separated from the garment refreshing system 100 by a bulkhead (not shown) proximate to doors 91. Additional garment refreshing system 100 may be located throughout the main cabin 82.

Figure 3:
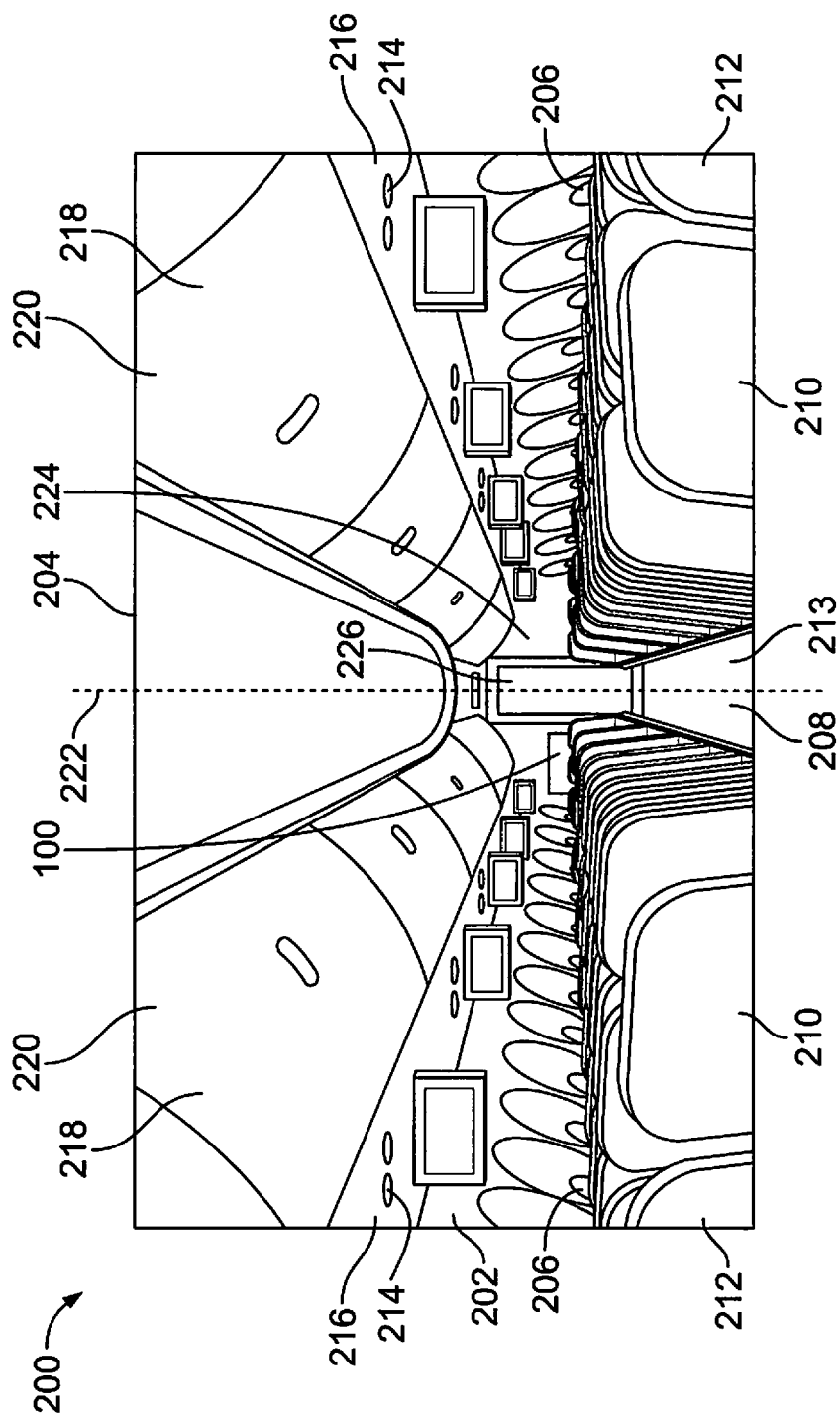
FIG. 3 illustrates a perspective interior view of an internal cabin of an aircraft, according to an embodiment of the present disclosure.

FIG. 3 illustrates a perspective interior view of an internal cabin 200 of an aircraft, according to an embodiment of the present disclosure. The internal cabin 200 includes outboard walls 202 connected to a ceiling 204. Windows 206 may be formed within the outboard walls 202. A floor 208 supports rows of seats 210. As shown in FIG. 3, a row 212 may include two seats 210 on either side of an aisle 213. However, the rows 212 may include more or less seats 210 than shown. Additionally, the internal cabin 200 may include more aisles than shown. Interior items within the internal cabin 200 may be attached to either fuselage substructure (such as frames, stringers, skin, rails, or the like), and/or floor structure (such as beams, intercostals, panels, seat tracks, or the like). Closets and class dividers may be attached to the floor and extend to the ceiling within the internal cabin 200.

Passenger service units (PSUs) 214 are secured between an outboard wall 202 and the ceiling 204 on either side of the aisle 213. The PSUs 214 extend between a front end and rear end of the internal cabin 200. For example, a PSU 214 may be positioned over each seat 210 within a row 212. Each PSU 214 may include a housing 216 that generally contains vents, reading lights, an oxygen bag drop panel, an attendant request button, and other such controls over each seat 210 (or groups of seats) within a row 212.

Overhead stowage bin assemblies 218 may be secured to the ceiling 204 and/or the outboard wall 202 above and inboard from the PSU 214 on either side of the aisle 213. The overhead stowage bin assemblies 218 may be secured over the seats 210. The overhead stowage bin assemblies 218 may extend between the front and aft end of the internal cabin 200. Each stowage bin assembly 218 may include a pivot bin or bucket 220 pivotally secured to a strongback (hidden from view in FIG. 3). The overhead stowage bin assemblies 218 may be positioned above and inboard from lower surfaces of the PSUs 214. The overhead stowage bin assemblies 218 are configured to be pivoted open in order to receive passenger carry-on baggage and personal items, for example.

As used herein, the term "outboard" means a position that is further away from a central longitudinal plane 222 of the internal cabin 200 as compared to another component. The term "inboard" means a position that is closer to the central longitudinal plane 222 of the internal cabin 200 as compared to another component. For example, a lower surface of a PSU 214 may be outboard in relation to a stowage bin assembly 218.

A garment refreshing system 100 may be positioned within the internal cabin 200 proximate to a bulkhead 224. A door 226 may be positioned within the bulkhead 224 and may lead to a cockpit. The garment refreshing system 100 may resemble or form a closet having an access door. Optionally, the garment refreshing system 100 may be positioned within a closet positioned within the internal cabin. The closet may be designed to attach to aircraft interior substructure (such as portions of the fuselage and/or to portions of the floor structure within an internal cabin) such that the closet provides fixed attachment of the garment refreshing system 100 within the cabin 200 during operation of an aircraft. Additionally, the closet may be configured to isolate the garment refreshing system 100 from the rest of the cabin 200 to reduce noise, vibration, heat, humidity, or the like.

Figure 4:
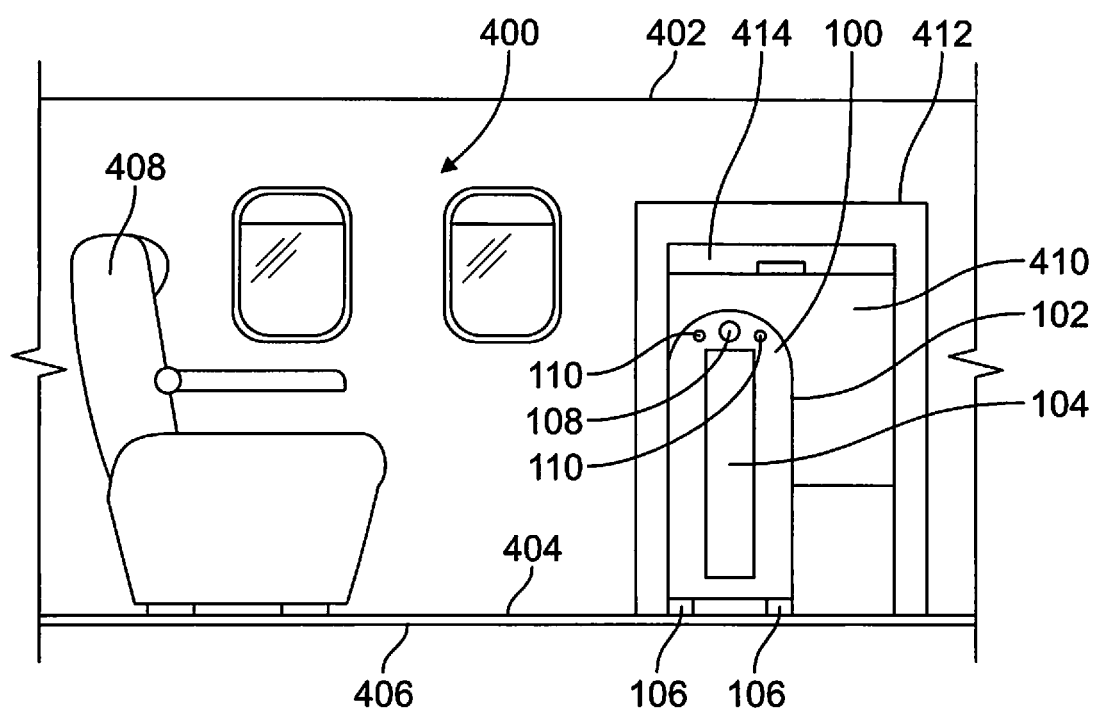
FIG. 4 illustrates a conceptual view of a garment refreshing system within an internal cabin of an aircraft, according to an embodiment of the present disclosure.

FIG. 4 illustrates a conceptual view of the garment refreshing system 100 within an internal cabin 400 of an aircraft 402, according to an embodiment of the present disclosure. The garment refreshing system 100 may be located within a first or business class section of the internal cabin 400. The garment refreshing system 100 may include a housing 102 defining a refreshing chamber or compartment (hidden from view) and an access door 104. The housing 102 may be securely connected to seat tracks 404 extending over the floor 406 through one or more fitting assemblies 106. The fitting assemblies 106 may be the same type of fitting assemblies 106 that are used to secure seats 408 to the seat tracks 404. The fitting assemblies 106 may be similar to those described in U.S. patent application Ser. No. 14/489,059, entitled "Systems and Methods for Securing Seats Within a Vehicle Cabin," which is hereby incorporated by reference in its entirety. Optionally, the garment refreshing system 100 may not be secured to the seat tracks 404 through the fitting assemblies 106. Instead, the garment refreshing system 100 may be secured within the internal cabin 400 through various other fasteners, such as bolts, screws, adhesives, and the like. Further, the garment refreshing system 100 may be secured to a wall and/or ceiling the internal cabin 400 in addition to, or instead of, the floor 406.

As shown, the garment refreshing system 100 may be positioned within an internal chamber 410 of a closet 412 within the internal cabin 400. The closet 412 may include a door 414 that is configured to be selectively opened and closed. Optionally, the garment refreshing system 100 may not be positioned within the closet 412, but may be securely mounted to the seat tracks 404, as described. In such an embodiment, the garment refreshing system 100 may resemble a closet. The garment refreshing system 100 may attach to the structure directly, or may attach to the closet, which may attach to the structure. The garment refreshing system 100 may be removable from the closet for ease of inspection, maintenance, or the like. In at least one embodiment, the garment refreshing system 100 may form an integral portion of a closet.

In operation, the access door 104 may be opened to expose the refreshing compartment. An individual may then position one or more garments within the refreshing compartment, and close the access door 104. After the access door 104 is closed, the garment refreshing system 100 may automatically operate to refresh the garment(s), such as by steaming, vibrating, agitating, irradiating with ultraviolet light, cleansing, and/or otherwise sanitizing the garment(s). Optionally, an individual may engage a user interface 108 (such as one or more of a button, dial, keypad, touchscreen, and/or the like) to initiate a refresh cycle. The housing 102 may also include one or more status indicators 110 (such as one or more of a light, display, screen, and/or the like) that may indicate the status of a refreshing operation. For example, a green light may indicate that the garment refreshing system 100 is able to accept a garment to be refreshed. A red light may indicate that a garment is currently being refreshed. A yellow light may indicate a drying cycle. Optionally, the housing 102 may not include any status indicator.

Figure 5A:
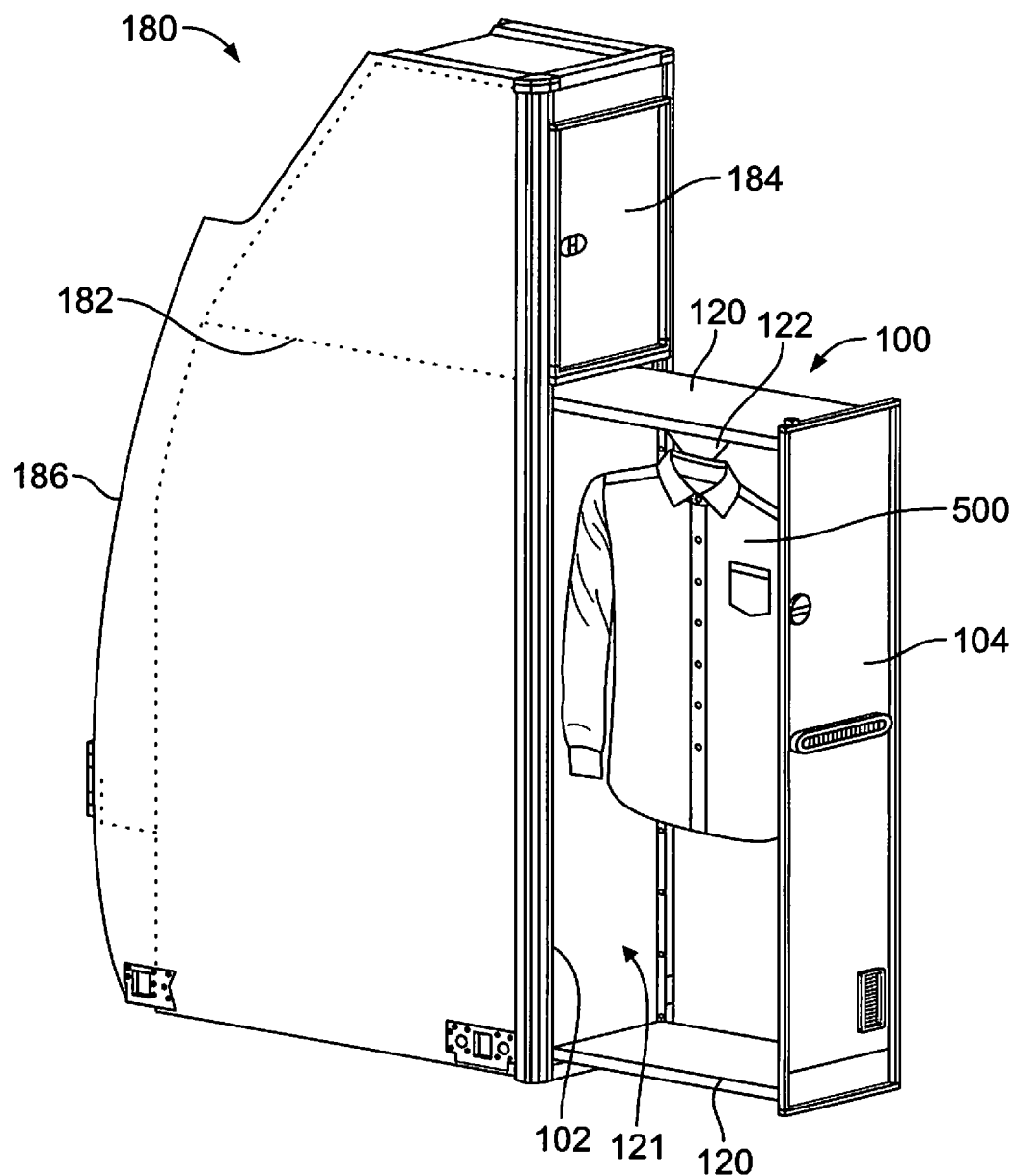
FIG. 5A illustrates a perspective view of a closet unit including a garment refreshing system having an open access door, according to an embodiment of the present disclosure.
Figures 5B, 5C:
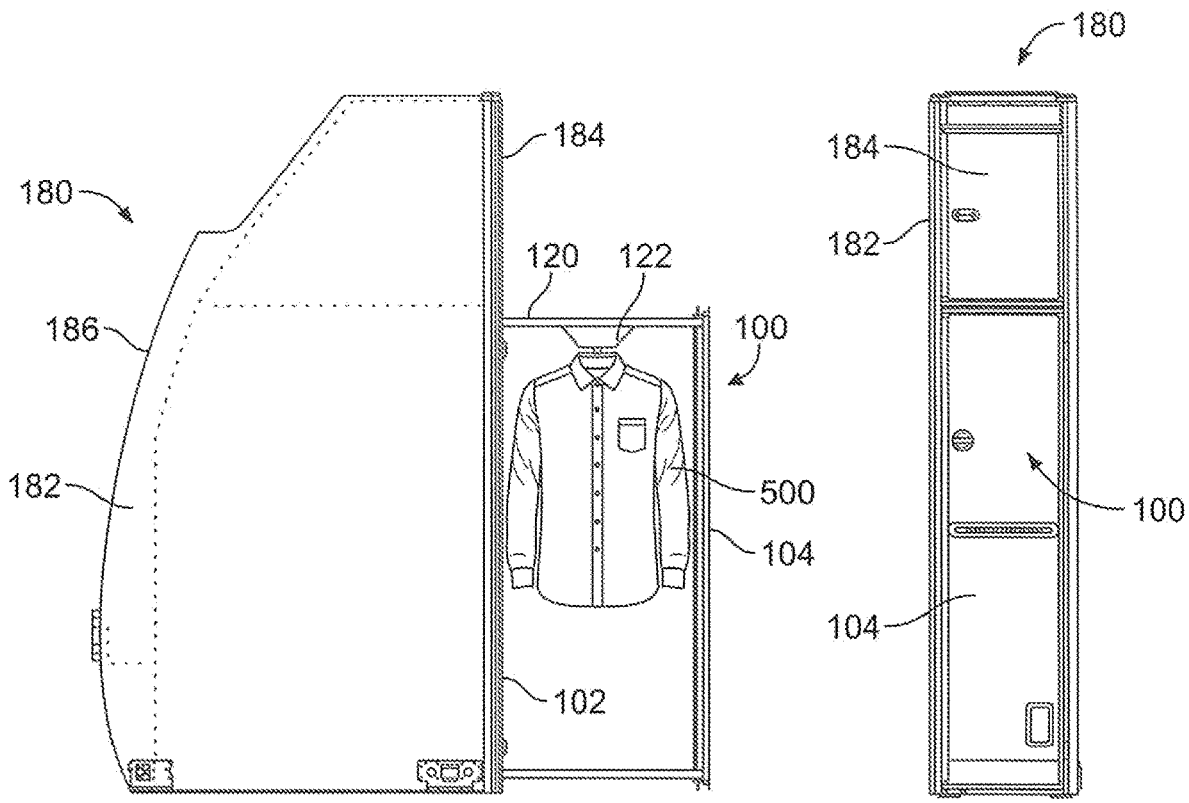
FIG. 5B illustrates a front view of a closet unit including a garment refreshing system having an open access door, according to an embodiment of the present disclosure.
FIG. 5C illustrates a lateral view of a closet unit including a garment refreshing system, according to an embodiment of the present disclosure.
Figure 5D:
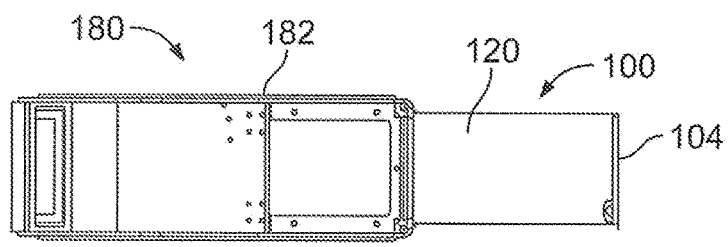
FIG. 5D illustrates a top view of a closet unit including a garment refreshing system having an open access door, according to an embodiment of the present disclosure.

FIG. 5A illustrates a perspective view of a closet unit 180 including the garment refreshing system 100 having an open access door 104, according to an embodiment of the present disclosure. FIG. 5B illustrates a front view of the closet unit 180 including the garment refreshing system 100 having the open access door 104. FIG. 5C illustrates a lateral view of the closet unit 180 including the garment refreshing system 100. FIG. 5D illustrates a top view of a closet unit 180 including the garment refreshing system 100 having the open access door 104. Referring to FIGS. 5A-D, the closet unit 180 is a modular component that is configured to be secured to an internal portion of a fuselage of an aircraft, and form a portion of internal cabin of the aircraft. The closet unit 180 includes a main body 180 that is sized and shaped to fit and secure within a fuselage of an aircraft. For example, the outer profile 186 may include arcuate and linear surfaces that conform to an interior surface of a fuselage of an aircraft so that the closet unit 180 securely fits within the fuselage. In this manner, the garment refreshing system 100 may seamlessly, unobtrusively, and discretely integrate into an aircraft.

The closet unit 180 is preferably tall and slender. In at least one embodiment, the closet unit 180 has an aspect ratio, envelope, or the like that occupies a reduced footprint on an aircraft. The closet unit 180 is lightweight in that the cabinetry or shell of the unit may be a lightweight engineered composite such as honeycomb composite paneling.

The closet unit 180 may include an upper storage closet 184 positioned above the garment refreshing system 100. The garment refreshing system 100 forms an integral portion of the closet unit 180, such as a lower portion below the upper storage closet 184. In at least one embodiment, the closet unit 180 may not include the upper storage closet 184. Instead, the entire interior space of the closet unit 180 may accommodate a larger garment refreshing system 100 than shown. In at least one other embodiment, the garment refreshing system 100 may be positioned above a lower storage closet.

The access door 104 of the garment refreshing system 100 may form an outer portion of the closet unit 100. As shown, the access door 104 may be configured to outwardly and axially extend from the housing 102 by way of beams 120 that slide on tracks (hidden from view) secured within the housing 102. When the access door 104 is opened, the refreshing compartment 121 is exposed. As such, a garment 500 (such as a shirt) may be hung from a rack 122 (such as one or more of a beam, a handle, a line, a strap, a wire, and/or the like) extending downwardly from an upper beam 120. After the garment 500 is hung from the rack 122, the access door 104 is closed, thereby moving the garment 500 into the refreshing compartment 121, and the refreshing cycle may commence.

Figure 6:
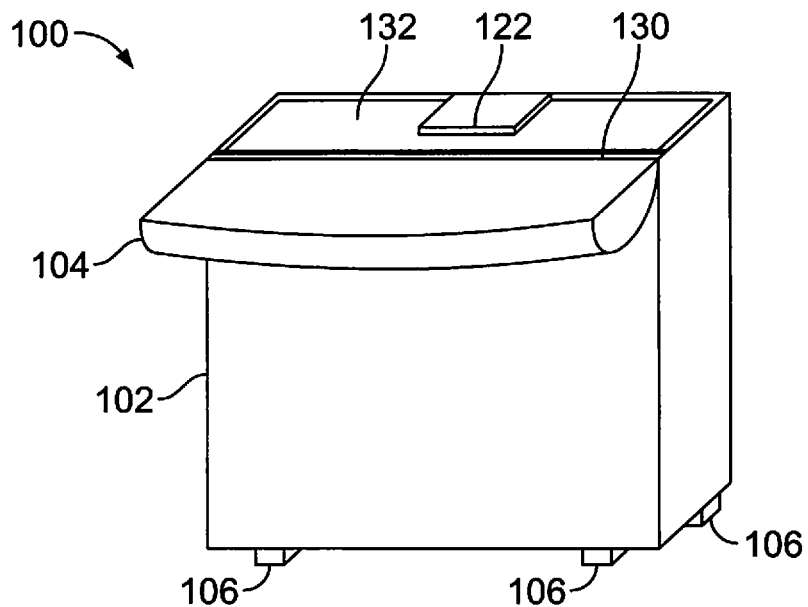
FIG. 6 illustrates a perspective front view of a garment refreshing system having an open access door, according to an embodiment of the present disclosure.

FIG. 6 illustrates a perspective front view of the garment refreshing system 100 having an open access door 104, according to an embodiment of the present disclosure. In this embodiment, the access door 104 is positioned on a top of the housing 102. The access door 104 is configured to swing open about a hinge 130, for example. When the access door 104 is opened, the refreshing compartment 121 is exposed. A rack 122 may extend from an interior surface 132 of the housing 102 into the refreshing compartment 121. A garment may be hung from the rack 122 within the refreshing compartment 121.

Figure 7:
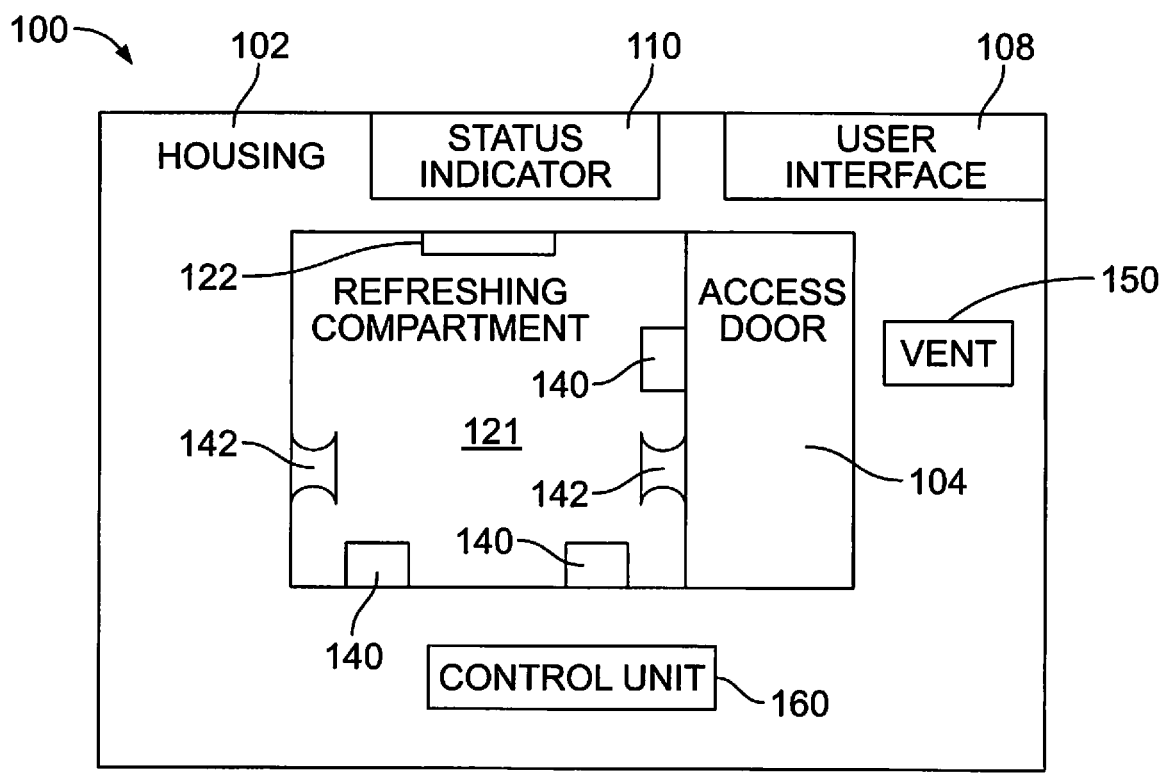
FIG. 7 illustrates a simplified schematic block diagram of a garment refreshing system, according to an embodiment of the present disclosure.

FIG. 7 illustrates a simplified schematic block diagram of the garment refreshing system 100, according to an embodiment of the present disclosure. The garment refreshing system 100 includes the housing 102 and the access door 104 moveably secured to the housing 102. The access door 104 is configured to be moved between a closed position, in which the refreshing compartment 121 is closed, and an open position, which the refreshing compartment 121 is exposed. When the refreshing compartment 121 is exposed, a garment may be hung from the rack 122.

One or more refreshers 140 may be positioned within the refreshing compartment 121. The refreshers 140 may include a mister, heater, and/or steamer configured to generate mist or steam within the refreshing compartment 121 to remove wrinkles and/or steam clean the garment. The refreshers 140 may include an agitator, such as a vibrating mechanism configured to vibrate the garment within the refreshing compartment 121 to remove wrinkles. The refreshers 140 may include detergent pod retainers that are configured to receive detergent pods (which may be scented or unscented) that may be punctured through a puncturing member (such as a bayonet, pin, or the like) and release a detergent mist into the refreshing compartment 121. The refresher 140 may include scent emitters that are configured to emit scented fragrances onto, into, or throughout the garment. The refreshers 140 may include an ultraviolet light that is configured to emit ultraviolet radiation into the refreshing compartment 121, which kills germs and microbes. The refreshers 140 may include one or more of a mister, a steamer, an ultraviolet light, a scent emitter (for example, a scent sprayer), a detergent emitter (for example, a detergent sprayer), an agitator (for example, a vibrating mechanism), a heater, and/or the like. The refreshers 140 may include any or all of such listed examples. The refreshers 140 may include less than all such listed examples. Further, the refreshers 140 may include various other type of sanitizing devices other than listed.

One or more dryers 142 may also be positioned within the refreshing compartment 121. The dryers 142 may be fans or blowers. The dryers 142 may be activated after the refreshers 140 complete a sanitizing cycle. Alternatively, the garment refreshing system 100 may not include the dryers 142.

A vent 150 may be formed on or in the housing 102. The vent 150 may be configured to control moisture that is expelled into an internal cabin of a vehicle. In at least one embodiment, the vent 150 may be coupled to a duct or outlet to an ambient atmosphere in order to divert generated moisture to an outside environment. Alternatively, the garment refreshing system 100 may not include the vent 150.

The garment refreshing system 100 may be configured to automatically operate when the access door 104 is closed and a start button of the user interface 108 is engaged. For example, when the start button is engaged, a predetermined refreshing cycle may commence.

The garment refreshing system 100 may also include a control unit 160 that is configured to control operation of the garment refreshing system 100. The control unit 160 may be operatively coupled to the refreshers 140, the dryers 142, the access door 104, the user interface 108, and the status indicator(s) 110. For example, the control unit 160 may detect when the access door 104 is opened or closed, and thereby determine whether or not a refreshing cycle may commence. The control unit 160 may receive operating commands input by an individual through the user interface 108 and operate the refreshers 140 and/or the dryers 142 based on the received operating commands. The control unit 160 may indicate an operating status of the garment refreshing system through the status indicator(s) 110. Alternatively, the garment refreshing system 100 may not include the control unit 160.

The garment refreshing system 100 may also include one or more power inputs, an input for receiving water and/or cleansing fluid, and/or the like. Additionally, the garment refreshing system 100 may include one or more fittings, housing, and/or the like that are configured to receive cleansing pods or the like.

As described above, the control unit 160 may be used to control operation of the garment refreshing system 100. As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 160 may be or include one or more processors that are configured to control operation of the garment refreshing system 100.

The control unit 160 is configured to execute a set of instructions that are stored in one or more storage elements (such as one or more memories), in order to process data. For example, the control unit 160 may include or be coupled to one or more memories. The storage elements may also store data or other information as desired or needed. The storage elements may be in the form of an information source or a physical memory element within a processing machine.

The set of instructions may include various commands that instruct the control unit 160 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 160. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 160 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 8:
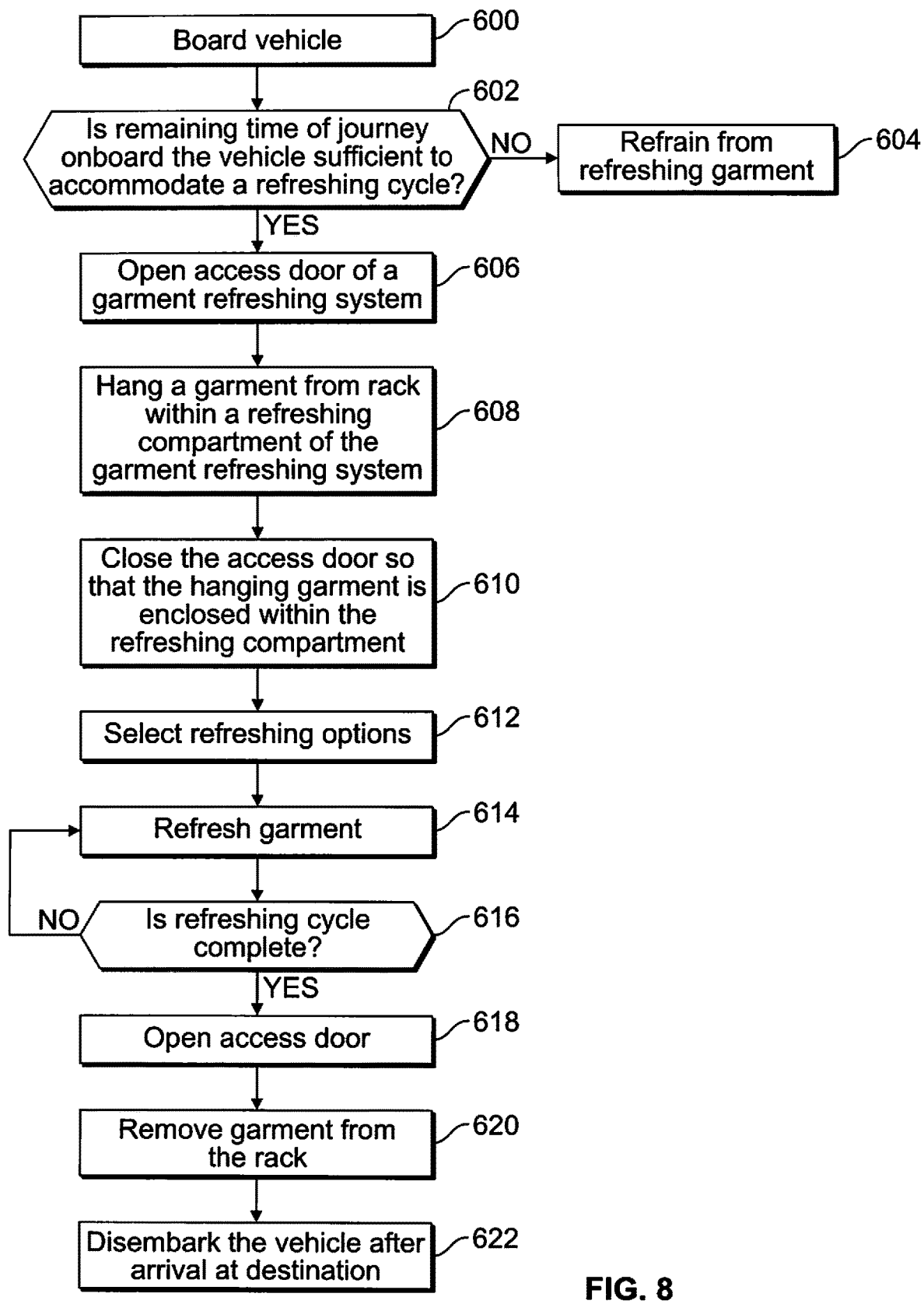
FIG. 8 illustrates a flow chart of a method of refreshing a garment onboard a vehicle, according to an embodiment of the present disclosure.

FIG. 8 illustrates a flow chart of a method of refreshing a garment onboard a vehicle, according to an embodiment of the present disclosure. At 600, a passenger boards a vehicle, such as a commercial aircraft. After the initial boarding process, the passenger may decide to have a garment (such as a jacket) refreshed. If so, the passenger or flight attendant determine at 602 whether the remaining time of a journey onboard the aircraft is sufficient to accommodate a refreshing cycle. For example, the passenger may provide the garment to a flight attendant before the aircraft taxis onto a runway, and the flight may be a transoceanic flight that provides ample time for a refreshing cycle. If there is not sufficient time for a refreshing cycle (such as a quick connecting flight between relatively close locations), the method proceeds from 602 to 604, in which the passenger refrains from refreshing the garment.

If, however, there is sufficient time for a refreshing cycle, the method proceeds from 602 to 606, in which the passenger or the flight attendant opens an access door of the garment refreshing system. After the access door is opened, the passenger or the flight attendant hangs a garment from a rack within a refreshing compartment of the garment refreshing system at 608. After the garment is hung within the open refreshing compartment, the passenger or the flight attendant closes the access door at 610 so that the hanging garment is enclosed within the refreshing compartment.

At 612, the passenger or the flight attendant may select refreshing options. For example, the refreshing options may include misting, steaming, anti-wrinkle, agitation, detergent, drying, ultraviolet treatment, and/or the like. After the refreshing options are selected, the garment refreshing system is activated to refresh the garment at 614. At 616, it is determined (such as by a control unit of the garment refreshing system) if the refreshing cycle is complete at 616. If not, the method returns to 614.

If the refreshing cycle is complete, the method proceeds from 616 to 618, in which the access door is opened, thereby exposing the refreshed garment within the refreshing compartment. The passenger or the flight attendant then removes the garment from the rack or line at 620. At 622, the passenger disembarks the aircraft after it has arrived, landed, and taxied to a gate at a destination.

Referring to FIGS. 1-8, embodiments of the present disclosure provide systems and methods for refreshing garments onboard a vehicle, such as a commercial aircraft. Embodiments of the present disclosure provide systems and methods that allow passengers to feel and look refreshed after a journey aboard a vehicle, such as a commercial aircraft. Embodiments of the present disclosure allow business travelers to efficiently utilize time aboard an aircraft by refreshing one or more garments, so that they do not need to do so after disembarking the aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:
 a fuselage having an internal cabin; and
 a garment refreshing system located within the internal cabin, wherein the garment refreshing system is positioned within a closet of the internal cabin, wherein the garment refreshing system is operable to refresh a garment of an individual within the internal cabin,
 wherein the garment refreshing system comprises:
  a housing defining a refreshing compartment;
  one or more refreshers within the refreshing compartment, wherein the one or more refreshers are operable to refresh the garment; and
  one or more one or more dryers within the refreshing compartment, wherein the one or more dryers are operable to dry the garment.

2. The aircraft of claim 1, wherein the one or more refreshers comprises one or more of a mister, a steamer, a scent emitter, a detergent emitter, a heater, or an agitator.

3. The aircraft of claim 1, wherein the one or more refreshers comprises an ultraviolet light.

4. The aircraft of claim 1, wherein the garment refreshing system comprises:
 a housing defining an internal refreshing compartment; and
 an access door moveable between a closed position in which the refreshing compartment is closed and an open position in which the refreshing compartment is opened, wherein the refreshing compartment receives the garment when the access door is in the open position.

5. The aircraft of claim 1, further comprising a seat track and at least one fitting on a floor within the internal cabin, and wherein the garment refreshing system securely mounts to the seat track through at least a portion of the at least one fitting.

6. The aircraft of claim 1, wherein the garment refreshing system comprises at least one vent operable to control a moisture level within one or both of the garment refreshing system or the internal cabin.

7. The aircraft of claim 1, wherein the garment refreshing system comprises a rack onto which the garment hangs.

8. The aircraft of claim 1, wherein the garment refreshing system comprises a control unit operatively coupled to a user interface, wherein the control unit operates the garment refreshing system based on operating commands input through the user interface.

9. An aircraft comprising:
 a fuselage having an internal cabin;
 at least one fitting on a floor within the internal cabin; and
 a garment refreshing system positioned within a closet located within the internal cabin, wherein the garment refreshing system securely mounts to at least a portion of the at least one fitting through at least one fitting assembly, wherein the garment refreshing system is operable to refresh a garment of an individual within the internal cabin, and wherein the garment refreshing system comprises:

a housing defining an internal refreshing compartment;

an access door moveable between a closed position in which the refreshing compartment is closed and an open position in which the refreshing compartment is opened, wherein the refreshing compartment receives the garment when the access door is in the open position;

a rack extending into the refreshing compartment, wherein the garment hangs from the rack;

one or more refreshers within the refreshing compartment operable to refresh the garment, wherein the one or more refreshers comprises one or more of a mister, a steamer, an ultraviolet light, a scent emitter, a detergent emitter, a heater, or an agitator;

one or more dryers operable to dry the garment;

at least one vent operable to control a moisture level within one or both of the garment refreshing system or the internal cabin; and a control unit operatively coupled to a user interface, wherein the control unit operates the garment refreshing system based on operating commands input through the user interface.

10. A method of refreshing a garment while onboard an aircraft including a fuselage having an internal cabin, the method comprising:

positioning a garment refreshing system within a closet of the internal cabin of the fuselage; and refreshing a garment of an individual onboard the aircraft with the garment refreshing system, wherein the refreshing comprises:

using one or more refreshers within a refreshing compartment of a housing of the garment refreshing system to refresh the garment; and using one or more dryers within the refreshing compartment of the housing to dry the garment within the garment refreshing system.

11. The method of claim 10, wherein the one or more refreshers comprises one or more of a mister, a steamer, a scent emitter, a detergent emitter, a heater, or an agitator.

12. The method of claim 10, wherein the one or more refreshers comprises an ultraviolet light.

13. The method of claim 10, further comprising:

moving an access door of the garment refreshing system to expose an internal refreshing compartment of a housing;

receiving the garment within the refreshing compartment; and closing the access door to close the garment within the refreshing compartment, wherein the refreshing operation occurs after the closing operation.

14. The method of claim 10, wherein the positioning operation comprises securely mounting the garment refreshing system to at least one seat track through at least one fitting on a floor within the internal cabin.

15. The method of claim 10, further comprising venting moisture from the garment refreshing system.

16. The method of claim 10, further comprising hanging the garment on a rack of the garment refreshing system.

17. The method of claim 10, further comprising operating the garment refreshing system with a control unit based on commands input through a user interface.

\* \* \* \* \*